United States Patent [19]

McFarland

[11] Patent Number: 5,489,139
[45] Date of Patent: Feb. 6, 1996

[54] PARALLEL LINK SEATPOST SUSPENSION

[76] Inventor: Ryan J. McFarland, 120 Mount Rushmore Rd., Custer, S. Dak. 57730

[21] Appl. No.: 430,760

[22] Filed: Apr. 27, 1995

[51] Int. Cl.⁶ ....................................... B62J 1/04
[52] U.S. Cl. ..................... 297/195.1; 248/586; 280/283; 297/208
[58] Field of Search ................................ 297/195.1, 208; 248/564, 585–587; 280/275, 283

[56] References Cited

U.S. PATENT DOCUMENTS

| 2,39,211 | 4/1946 | du Pont | 297/208 |
| 2,949,153 | 8/1960 | Hickman | 248/585 |
| 3,314,672 | 4/1967 | Persson | 248/585 X |
| 4,456,295 | 6/1984 | Francu | 297/211 |
| 4,736,983 | 4/1988 | Furbee | 297/209 |
| 5,044,648 | 9/1991 | Knapp | 280/283 |

FOREIGN PATENT DOCUMENTS

| 27505 | 7/1924 | France | 297/208 |
| 152186 | 9/1903 | Germany | 297/208 |
| 250368 | 9/1926 | Italy | 297/209 |
| 151915 | 10/1920 | United Kingdom | 297/208 |
| 154369 | 12/1920 | United Kingdom | 297/208 |
| 265885 | 2/1927 | United Kingdom | 297/209 |
| 474349 | 10/1937 | United Kingdom | 297/209 |

OTHER PUBLICATIONS

"Bike" magazine article Ten Underrated Products You Probably Don't Own But Maybe Should (in part) Jan. 1994, two pp. 82 and 83.

"Bike" magazine article Softride Contour Mar. 1994, two pp. 64 and 65.

"Mountain Bike Action" picture and caption describing Body Shock, Jan. 1994, one p. 48.

"Mountain Bike" magazine advertisement for Power Post, Jun., 1994, one p. 26.

*Primary Examiner*—Peter R. Brown
*Attorney, Agent, or Firm*—Gene R. Woodle

[57] ABSTRACT

Embodiments of a new bicycle seatpost with an integrated suspension system are disclosed in which the seatpost may be mounted on a bicycle and upon which a seat may mounted and in which a rider is cushioned from bumps by two parallel linkages with resilient means interposed allowing the seat to react to bumps by resiliently rocking to the rear and downward while maintaining constant saddle angle and minimizing change in seat to pedal distance due to suspension movement.

4 Claims, 4 Drawing Sheets

5,489,139

PARALLEL LINK SEATPOST SUSPENSION

INTRODUCTION

The present invention relates to a suspension system for a bicycle or similar vehicle which cushions the rider from bumps. The invention provides a seatpost suspension system with an optimum direction of travel and which maintains necessary frame rigidity.

For nearly as long as there have been bicycles, there have been attempts to increase riding comfort by incorporating various types of suspension systems someplace in the bicycle. The interest in rider comfort has grown dramatically in recent years because of the tremendous increase in off-road use of what have become known as mountain bikes or all terrain bicycles. In addition, rider comfort has become more important because many modern cyclists ride for significantly greater distances.

Most attempts to create a suspension system for a bicycle may be considered to fall into one of three basic categories: motorcycle style springs or shock absorbers, sprung seats, or seatpost suspension systems.

Motorcycle style suspension systems interpose a spring or shock absorber between either wheel or both wheels and the frame of the bicycle. The affected wheel may move independently of the frame. When a bump is encountered the spring or shock absorber absorbs at least some of the bump and prevents at least some of the wheel's bump induced movement from being transferred to the frame. Reduction in bicycle weight is a major goal of most modern cyclists. Motorcycle style suspension systems are inherently heavy.

Sprung seat suspension systems generally in, corporate one or more springs within the seat itself to cushion the rider from bumps. In the simplest devices the springs are mounted vertically and allow the seat to bounce up and down. In other cases a more complicated system allows the seat to rock forward and backward as well as to move up and down. The use of a sprung seat precludes the use of other types of seats which the rider may prefer for different conditions. Sprung seats lack stability and a relatively rigid frame and seat are necessary for the efficient transfer of energy from the rider to the bicycle.

Seatpost suspension systems usually incorporate a spring or shock absorber within the seatpost of the bicycle. Ordinarily such systems allow an attached seat to move up and down along the axis of the seatpost. In operation, the rider moves up and down along this same axis in reaction to an encountered bump. Movement along this axis causes the distance between the pedals and the seat to vary which makes the transfer of energy from the rider to the bicycle less efficient.

One of the objectives of the present invention is to provide a simple, lightweight, and inexpensive seatpost suspension system for a bicycle. Another objective of the present invention is to provide a suspension system which maintains frame rigidity to a great extent. Another objective of the present invention is to provide a suspension system in which the distance from the seat to the pedals remains relatively constant. Maintenance of a level seat is important to rider comfort and efficiency. Another objective of the present invention is to provide a suspension system in which the top of the seat remains level when a bump is encountered. When the rear wheel of a bicycle hits a bump, the rear of the bicycle moves upward and forward, rotating about the front axle. This upward and forward direction is referred to as the direction of the bump force. Another objective of the present invention is to provide a suspension system which allows the seat to move downward and rearward, countering the upward and forward direction of the bump force. Another objective of the present invention is to provide a seatpost suspension system for a bicycle which allows the use of nearly any conventional bicycle seat.

These and other objects of the invention will be apparent to those skilled in this art from the following detailed description of a preferred embodiment of the invention.

BRIEF DESCRIPTION OF THE INVENTION

The bicycle seatpost with an integrated suspension system includes a bracket which may be attached to the seatpost acceptor on a bicycle. The bottoms of two "L" shaped arms are attached by pivot pins to the bracket with one at the rear of the bracket and the other at the front. A saddle clamp base is attached by pivot pins to the tops of the two "L" shaped arms. Means for attaching a conventional seat is provided on the top of the saddle clamp base. The "L" shaped arms form the rough shape of a parallelogram. The arms and the saddle clamp may move in an arc within the plane of the bicycle, pivoting on the pivot pins in the bracket. When the seat is near the top of the arc, the arms are at their greatest distance apart. As the seat moves rearward through the arc, the distance between the arms becomes smaller. A resilient means is interposed between the arms tending to force the arms apart and the seat toward the top of the arc. When the bicycle hits a bump, the resilient means compresses, allowing the seat to rock downward and backward, generally moving in the opposite direction as the direction of the bump force.

BRIEF DESCRIPTION OF THE DRAWINGS

The invention will be further described in connection with the accompanying drawings in which.

DETAILED DESCRIPTION OF THE INVENTION

Figure 1:
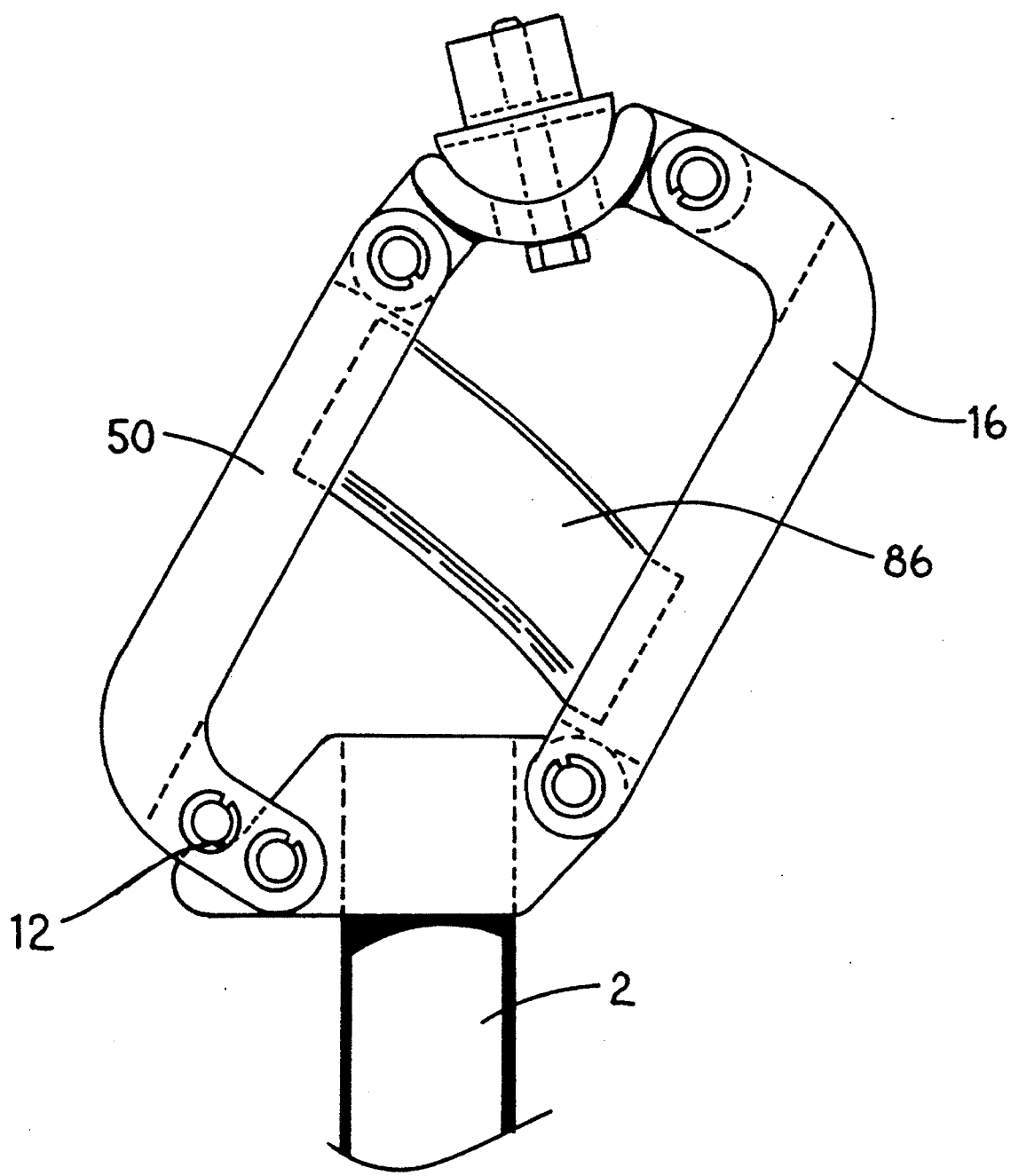
FIG. 1 is a side view of a seatpost constructed in accordance with the invention.

The seatpost of the invention is shown in a side view in FIG. 1. The bottom of a cylindrical post 2 may be attached to the conventional seatpost receptor of a bicycle.

Figure 2:
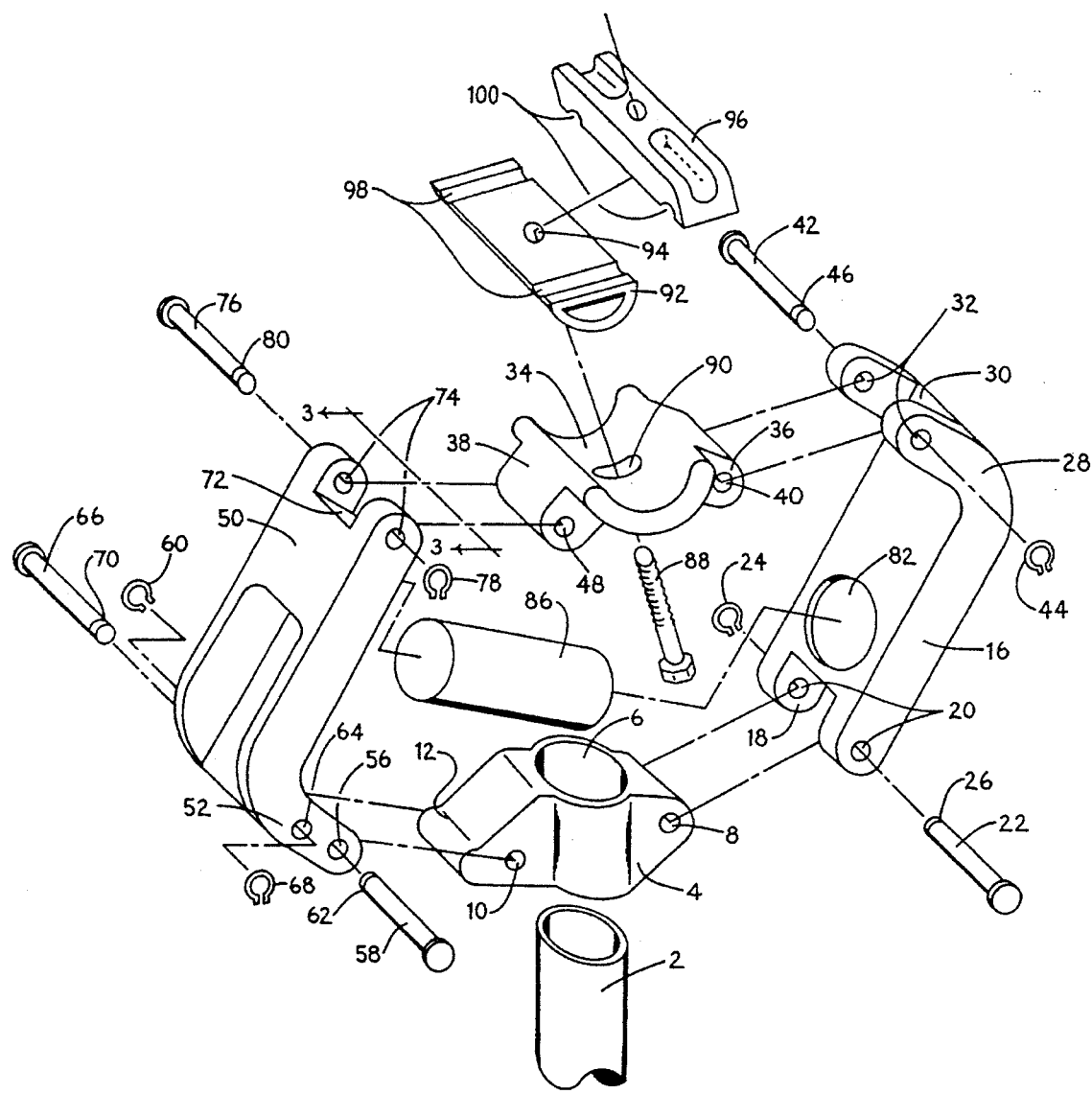
FIG. 2 is an exploded isometric view of a seatpost constructed in accordance with the invention.

Referring now to FIG. 2 which shows an exploded isometric view of the invention. A bracket 4 includes a vertical opening 6 which fits over the top of post 2. There is a hole 8 perpendicular to the plane of the bicycle near the upper rear of bracket 4. There is another hole 10 also perpendicular to the plane of the bicycle near the lower front of bracket 4. There is a horizontal stop surface 12 on the forward top of bracket 4. The hole 10 is near the front of bracket 4, but rearward of stop surface 12.

The bottom of a rear arm 16 includes a notch 18 slightly wider than the rearward end of bracket 4. There are two aligned holes 20 in the bottom of rear arm 16 perpendicular to the plane of the bicycle. Notch 18 fits over the rear of bracket 4. Rear arm 16 is attached to bracket 4 by a pivot pin 22 which passes through hole 8 and holes 20. Pivot pin 22 is held in place by a spring clip 24 which engages with a slot 26. A typical configuration of pins, spring clips, and slots is shown in FIG. 3.

Still referring to FIG. 2, the rear arm 16 has the general shape of an "L" with the shorter end at the top and forming a leg 28 and the opening of the "L" facing forward. The leg 28 has a notch 30 the same width as the notch 18. There are two aligned holes 32 through the forward end of leg 28 perpendicular to the plane of the bicycle.

A saddle clamp base 34 having the general shape of a shallow "U" has a leg 36 at its rearward end and a leg 38 at its forward end. The width of leg 36 is slightly less than the width of notch 30. A hole 40 through leg 36 is perpendicular to the plane of the bicycle. The saddle clamp base 34 is attached to the rear arm 16 by a pivot pin 42 inserted through holes 32 and hole 40. The pivot pin 42 is held in place by a spring clip 44 which fits into a slot 46. There is a hole 48 perpendicular to the plane of the bicycle through leg 38.

Figure 3:
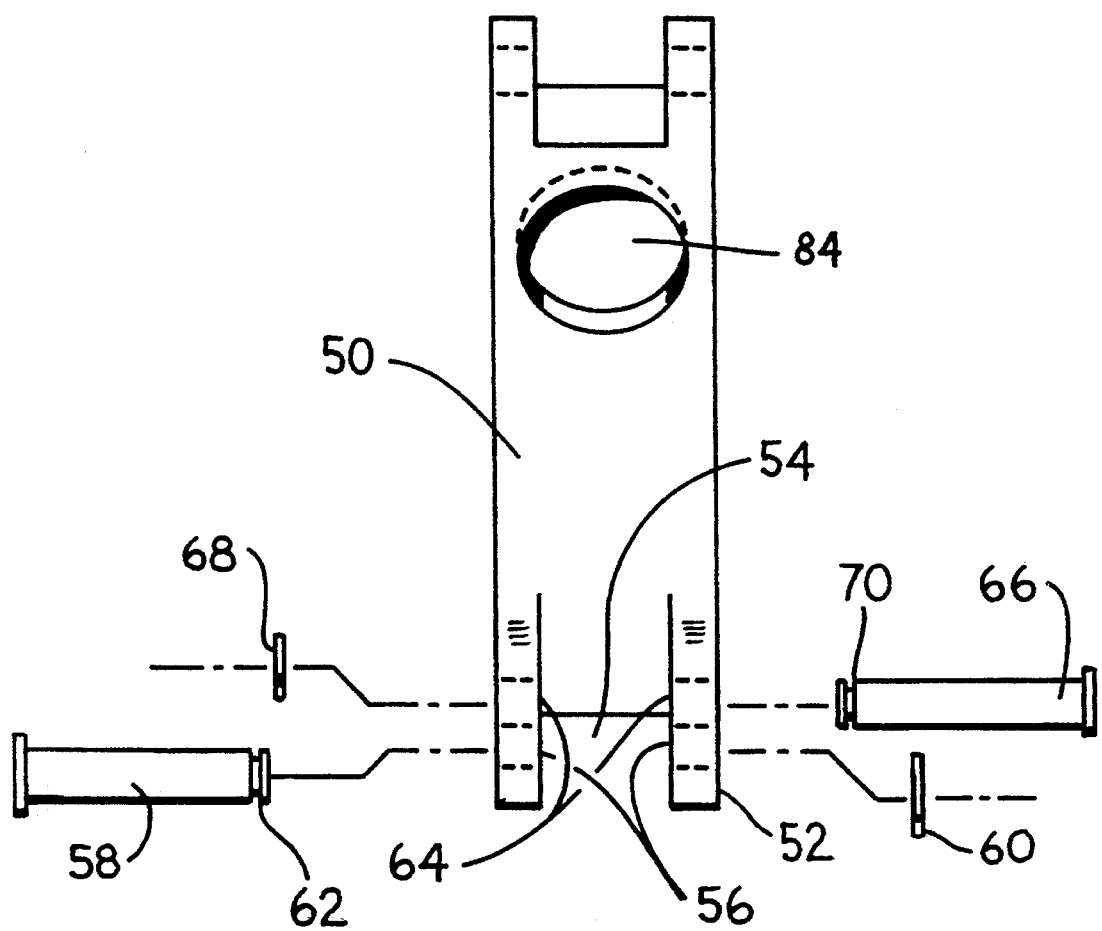
FIG. 3 is a partial cross-sectional view of the seatpost shown in FIG. 2 taken along lines 3—3.

Referring now to FIG. 3, a front arm 50 has the general shape of an "L" with the shorter end of the "L" forming a leg 52 at the bottom and with the opening of the "L" facing rearward. The rearward end of leg 52 has a notch 54 slightly wider than the width of the forward end of bracket 4. There are two aligned holes 56 perpendicular to the plane of the bicycle near the rearward end of leg 52. Front arm 50 is attached to the forward end of bracket 4 by a pivot pin 58 inserted through holes 56 and hole 10 in bracket 4. Pivot pin 58 is held in place by spring clip 60 which fits into slot 62. There are two aligned holes 64 perpendicular to the plane of the bicycle through the leg 52 forward of holes 56. A stop pin 66 is inserted through holes 64 and held in place by spring clip 68 engaged with slot 70.

Referring again to FIG. 2, there is a notch 72 slightly wider than the width of leg 38 on saddle clamp base 34 at the upper end of front arm 50. There are two aligned holes 74 perpendicular to the plane of the bicycle through the upper end of front arm 50. Front arm 50 is attached to saddle clamp base 34 by a pivot pin 76 inserted through holes 74 and hole 48 in leg 38. Pivot pin 76 is held in place by spring clip 78 engaged with a slot 80.

Still referring to FIG. 2, there is a cylindrical indentation 82 near the bottom of the forward face of rear arm 16. Referring briefly to FIG. 3, there is a similar cylindrical indentation 84 near the top of the rearward face of front arm 50. A spring 86 is interposed between rear arm 16 and front arm 50. The top of spring 86 fits within indentation 84 and the bottom of spring 86 fits within the indentation 82.

Referring again to FIG. 2, a saddle bolt 88 is inserted upward through a clamp slot 90 in the "U" shaped portion of saddle clamp base 34. A clamp barrel 92 with a "D" shape rests on the top surface of the "U" shape of the clamp base 34. The saddle bolt 88 passes through barrel hole 94 in the clamp barrel 92. The saddle bolt 88 screws into a clamp nut 96.

Still referring to FIG. 2, the top surface of clamp barrel 92 includes two saddle rail channels 98 which have the shape of a half cylinder. The saddle rail channels 98 are on either side of the top surface of clamp barrel 92, are generally horizontal, and run parallel to the plane of the bicycle. The bottom surface of clamp nut 96 includes two saddle rail channels 100 which mirror the saddle rail channels 98. Most conventional bicycle seats have standard rails for mounting. Such a seat is mounted to the seatpost by placing the rails inside saddle rail channels 98 and saddle rail channels 100 and tightening saddle bolt 88. The saddle bolt 88 may be moved within clamp slot 90 before tightening to adjust the seat to the preferred position.

Figure 4:
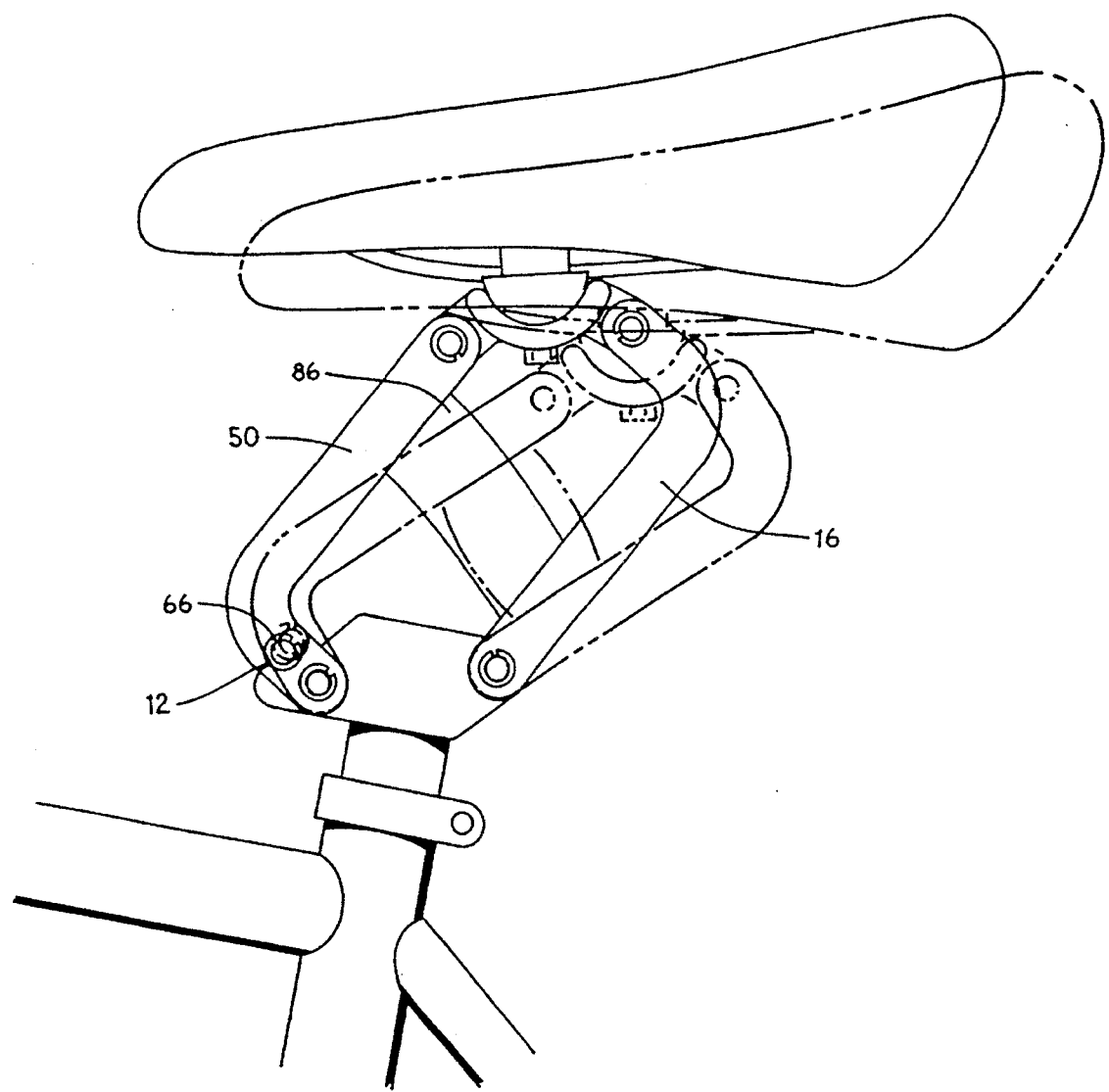
FIG. 4 is a side view of a seatpost constructed in accordance with the invention which shows the seatpost incorporated into a bicycle and the range of motion of the seatpost.

The seatpost of the invention is shown in operation in FIG. 4. In the at-rest or forward position the spring 86 tends to force the rear arm 16 and the front arm 50 apart. Because of the configuration of the seatpost, this action tends to force the seatpost forward until stop pin 66 contacts stop surface 12. When the rear wheel of the bicycle hits a bump the seatpost cushions the impact by rocking rearward and downward generally moving in the opposite direction from the direction of the bump force. Although the seatpost does move in a rearward and downward direction, frame rigidity is maintained to a great extent because the design of the seatpost prevents the seat from moving out of the plane of the bicycle and prevents the seat from twisting. The design of the seatpost also causes the distance from the seat to the pedals to remain relatively constant when a bump is encountered.

In the preferred embodiment of the invention the bracket 4, the rear arm 16, the front arm 50, and the saddle clamp base 34 are made of machined aluminum; but stainless steel or the like could be used. The post 2 is made of aluminum; but stainless steel or the like could be used. The post 2 is glued to the bracket 4; but other fastening methods could be used. The spring 86 is made of solid, cylindrical polyurethane, but a steel spring or other resilient material could be used. The other elements of the seatpost are made of steel.

While the preferred embodiment of the invention has been shown and described, it will be apparent to those skilled in this art that various modifications may be made in this embodiment without departing from the spirit of the present invention. For that reason, the scope of the invention is set forth in the following claims:

I claim:

1. A bicycle seatpost with an integrated suspension system comprising:

(1) A bracket having a bottom end and a top end, the bottom end having means for mounting the bracket to the seatpost acceptor on the frame of a bicycle, said bracket having a forward end nearest to the front of the bicycle and a rearward end nearest to the rear of the bicycle, the forward end having a hole perpendicular to the plane of the bicycle and the rearward end having a hole perpendicular to the plane of the bicycle;

(2) A rear arm having the general shape of an "L" with a longer leg of the "L" near the bottom, with a shorter leg of said "L" near the top, and with said "L" opening toward the front of the bicycle, the longer leg having a notch which fits over the rearward end of said bracket and having two holes through the stubs created by the notch near the forward end of said longer leg perpendicular to the plane of the bicycle and alignable with the hole in the rearward end of said bracket, the rear arm being attached to said bracket by a pivot pin inserted through said hole in the rearward end of said bracket and the holes near the forward end of said longer leg, the shorter leg of said rear arm also having a notch near its forward end and having two holes through the stubs created by the notch near the forward end of said shorter leg perpendicular to the plane of the bicycle;

(3) A front arm having the general shape of an "L" with a longer leg of the "L" near the top, with a shorter leg of said "L" near the bottom, and with said "L" opening toward the rear of the bicycle, the shorter leg having a notch which fits over the forward end of said bracket and having two holes through the stubs created by the notch near the rearward end of said shorter leg perpendicular to the plane of the bicycle and alignable with the hole in the forward end of said bracket, the front arm being attached to said bracket by a pivot pin inserted through said hole in the forward end of said bracket and the holes near the rearward end of said shorter leg, the longer leg of said front arm also having a notch near its rearward end and having two holes through the stubs created by the notch near the rearward end of said longer leg perpendicular to the plane of the bicycle;

(4) A saddle clamp base having a top and a bottom end, the top of the saddle clamp base having means for mounting a bicycle seat, said saddle clamp base also having a forward end and a rearward end, the forward end being slightly narrower than the width of the notch in said longer leg of said front arm and having a hole perpendicular to the plane of the bicycle and alignable with said holes in said longer leg of said front arm, said forward end of said saddle clamp base fitting within said notch in said longer leg of said front arm and held in place by a pivot pin inserted through said holes in said longer leg of said front arm and the hole in said forward end of said saddle clamp base, rearward end being slightly narrower than the width of the notch in said shorter leg of said rear arm and having a hole perpendicular to the plane of the bicycle and alignable with said holes in said shorter leg of said rear arm, said rearward end of said saddle clamp base fitting within said notch in said shorter leg of said rear arm and held in place by a pivot pin inserted through said holes in said shorter leg of said rear arm and the hole in said rear end of said saddle clamp base, the distance between said hole in said forward end of said saddle clamp base and said hole in said rearward end of said saddle clamp base is such that said longer leg of said rear arm and said longer leg of said front arm are parallel;

(5) Resilient means for resiliently applying pressure to the forward face of said rear arm and to the rearward face of said front arm tending to force said rear arm and said front arm apart; and (6) Pivot pin fastening means to hold said pivot pins in place without restricting the rotational movement of said pivot pins;

whereby when the seatpost is attached to a bicycle and a seat attached to the seatpost and when the bicycle hits a bump the seat moves downward and backward and, in cooperation with the resilient means, cushions the rider from the impact of the bump.

2. A bicycle seatpost with an integrated suspension system as set forth in claim 1 in which the forward end of said bracket includes a stop surface forward of said holes in said bracket and parallel with the ground and in which said shorter leg of said front arm includes a stop pin forward of said hole in said shorter leg of said front arm, and in which said stop pin prevents the bicycle seat from moving forward past the point at which said stop pin contacts said stop surface.

3. A bicycle seatpost with an integrated suspension system comprising:

(1) A bracket having a bottom end and a top end, the bottom end having means for mounting the bracket to the seatpost acceptor on the frame of a bicycle, said bracket having a forward end nearest to the front of the bicycle and a rearward end nearest to the rear of the bicycle, the forward end having a hole perpendicular to the plane of the bicycle and the rearward end having a hole perpendicular to the plane of the bicycle;

(2) A rear arm having the general shape of an "L" with a longer leg of the "L" near the bottom, with a shorter leg of said "L" near the top, and with said "L" opening toward the front of the bicycle, the longer leg having a notch which fits over the rearward end of said bracket and having two holes through the stubs created by the notch near the forward end of said longer leg perpendicular to the plane of the bicycle and alignable with the hole in the rearward end of said bracket, the rear arm being attached to said bracket by a pivot pin inserted through said hole in the rearward end of said bracket and the holes near the forward end of said longer leg, the shorter leg of said rear arm also having a notch near its forward end and having two holes through the stubs created by the notch near the forward end of said shorter leg perpendicular to the plane of the bicycle;

(3) A front arm having the general shape of an "L" with a longer leg of the "L" near the top, with a shorter leg of said "L" near the bottom, and with said "L" opening toward the rear of the bicycle, the shorter leg having a notch which fits over the forward end of said bracket and having two holes through the stubs created by the notch near the rearward end of said shorter leg perpendicular to the plane of the bicycle and alignable with the hole in the forward end of said bracket, the front arm being attached to said bracket by a pivot pin inserted through said hole in the forward end of said bracket and the holes near the rearward end of said shorter leg, the longer leg of said front arm also having a notch near its rearward end and having two holes through the stubs created by the notch near the rearward end of said longer leg perpendicular to the plane of the bicycle;

(4) A saddle clamp base having a top and a bottom end, the top of the saddle clamp base having means for mounting a bicycle seat, said saddle clamp base also having a forward end and a rearward end, the forward end being slightly narrower than the width of the notch in said longer leg of said from arm and having a hole perpendicular to the plane of the bicycle and alignable with said holes in said longer leg of said from arm, said forward end of said saddle clamp base fitting within said notch in said longer leg of said from arm and held in place by a pivot pin inserted through said holes in said longer leg of said from arm and the hole in said forward end of said saddle clamp base, rearward end being slightly narrower than the width of the notch in said shorter leg of said rear arm and having a hole perpendicular to the plane of the bicycle and alignable with said holes in said shorter leg of said rear arm, said rearward end of said saddle clamp base fitting within said notch in said shorter leg of said rear arm and held in place by a pivot pin inserted through said holes in said shorter leg of said rear arm and the hole in said rear end of said saddle clamp base, the distance between said hole in said forward end of said saddle clamp base and said hole in said rearward end of said saddle clamp base is such that said longer leg of said rear arm and said longer leg of said front arm are parallel;

(5) A spring interposed between said rear arm and said front arm, the longitudinal axis of the spring being roughly perpendicular to said rear arm and said front arm, the top of said spring abutting said front arm and the bottom of said spring abutting said rear arm;

(6) Pivot pin fastening means to hold said pivot pins in place without restricting the rotational movement of said pivot pins; and (7) Spring fastening means to hold said spring in place interposed between said rear arm and said front arm;

whereby when the seatpost is attached to a bicycle and a seat attached to the seatpost and when the bicycle hits a bump the seat moves downward and backward and, in cooperation with the resilient means, cushions the rider from the impact of the bump.

4. A bicycle seatpost with an integrated suspension system as set forth in claim 3 in which the forward end of said bracket includes a stop surface forward of said holes in said bracket and parallel with the ground and in which said shorter leg of said front arm includes a stop pin forward of said hole in said shorter leg of said front arm, and in which said stop pin prevents the bicycle seat from moving forward past the point at which said stop pin contacts said stop surface.

* * * * *